United States Patent [19]

Johnson et al.

[11] Patent Number: 5,291,975
[45] Date of Patent: Mar. 8, 1994

[54] SYSTEM AND METHOD FOR DAMPING NARROW BAND AXIAL VIBRATIONS OF A ROTATING DEVICE

[75] Inventors: Bruce G. Johnson, Monument, Colo.; Richard Hockney, Lynnfield, Mass.; David Eisenhaure, Hull, Mass.; Ralph Fenn, Cambridge, Mass.

[73] Assignee: SatCon Technology Corporation, Cambridge, Mass.

[21] Appl. No.: 967,806

[22] Filed: Oct. 27, 1992

[51] Int. Cl.$^5$ .............................................. F16F 7/10
[52] U.S. Cl. ..................................... 188/378; 267/136
[58] Field of Search ...................... 188/378, 379, 380; 248/550; 267/136; 367/191; 318/561

[56] References Cited

U.S. PATENT DOCUMENTS 5,209,326  5/1993  Harper .................... 188/378

Primary Examiner—Douglas C. Butler
Attorney, Agent, or Firm—Joseph S. Iandiorio

[57] ABSTRACT

A system and method for damping narrow band axial vibrations of a rotating device in which a reaction mass is coupled to the rotating device and a reaction mass actuator is employed to move the reaction mass axially along the rotating device. An effect of vibrations on the rotating device is then measured, and in response the reaction mass is moved axially to damp the effect of vibrations and so the vibrations.

21 Claims, 2 Drawing Sheets

SYSTEM AND METHOD FOR DAMPING NARROW BAND AXIAL VIBRATIONS OF A ROTATING DEVICE

FIELD OF INVENTION

This invention relates to a system and method for damping narrow band axial vibrations of a rotating device using a reaction mass coupled to the rotating device.

BACKGROUND OF INVENTION

The use of reaction mass actuators to absorb or suppress vibrations of structures has received considerable attention. In these systems, reaction mass actuators are typically actively controlled using inputs from accelerometers mounted to the device to determine the force required to be produced by the reaction mass actuator to cancel the structural vibrations. Conventionally, the reaction mass actuator control algorithms require high loop band widths which result in performance sensitivity to sensor noise and poor stability margins for broadband or command-following control loops.

Vibrations are also recognized as a problem in rotating devices, for example in torpedo drive shafts. It has been recognized that the torpedo propeller causes axial vibrations of the rotating drive shaft that are transmitted to the torpedo body and radiate into the water as noise, allowing the torpedoes to be relatively easily detected. Accordingly, there is a great need to suppress axial vibrations of rotating structures, and vibrations caused by rotating structures.

SUMMARY OF INVENTION

It is therefore an object of this invention to provide a system and method for damping narrow band axial vibrations of a rotating device.

It is a further object of this invention to provide such a system and method which provides excellent vibration reduction at the fundamental and harmonic vibrational frequencies.

It is a further object of this invention to provide such a system and method which does not require high loop band widths in the control algorithm.

It is a further object of this invention to provide such a system and method which may be employed to damp axial vibrations of a torpedo drive shaft.

It is a further object of this invention to provide such a system and method in which the reaction mass actuator does not require position feedback for the control loop.

This invention results from the realization that axial vibrations of rotating devices such as torpedo drive shafts can be controlled by mounting a radially constrained but axially movable reaction mass proximate to or on the rotating device, and controlling axial movement of the reaction mass with a narrow band control algorithm that is responsive to measurement of the force and/or axial acceleration of the rotating device to drive the reaction mass at the fundamental and harmonic vibration frequencies to fully cancel the vibrations to effectively reduce radiated noise.

This invention features a system and method for damping narrow band axial vibrations of a rotating device in which a reaction mass is coupled in a manner in which it has an effect on vibrations of the rotating device, and means for moving the reaction mass to counter vibrations from the rotating device are provided. An effect of vibrations from the rotating device, such as force or acceleration, is then measured, and in response the reaction mass is moved to damp the effect of the vibrations and so the vibrations. Preferably, the rotational velocity of the rotating device is determined and the reaction mass movement is also responsive to the determined velocity to effectively cancel vibrations. The reaction mass in one embodiment is mounted to the rotating device, and in such a manner that it is radially constrained but axially movable, and preferably supplied as well with an axial restoring force to return the mass to its center position when not in use. The reaction mass actuator may be a Lorentz force type actuator with selectively energizable coils and a number of permanent magnets spaced circumferentially around the rotating device to provide the permanent magnetic field that reacts with the field created by the coils to produce the force to move the reaction mass in two directions to cancel the effect of vibrations from the rotating device.

DISCLOSURE OF PREFERRED EMBODIMENT

Other objects, features and advantages will occur to those skilled in the art from the following description of a preferred embodiment and the accompanying drawings in which.

This invention features a system and method for damping narrow band axial vibrations of a rotating device in which a reaction mass is coupled to, or close to, the rotating device. The reaction mass coupled to the rotating device is constrained radially but allowed to move axially in both directions. The system measures an effect, such as acceleration or force, of the vibrations on the rotating device, and includes a narrow band control algorithm to generate control signals at the force fundamental and harmonic frequencies to drive the reaction mass so that it cancels rotating device vibrations to cancel noise radiated from the rotating device.

Figure 1:
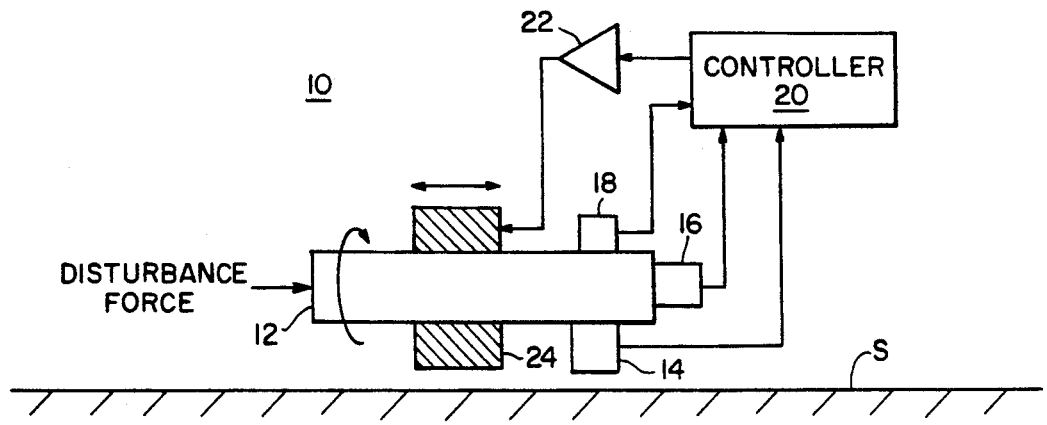
FIG. 1 is a schematic diagram of a system for damping narrow band axial vibrations of a rotating device according to this invention also appropriate for practicing the method of this invention.

There is shown in FIG. 1 system 10 according to this invention for damping narrow band axial vibrations of rotating device 12. System 10 may also be used to practice the method of this invention. System 10 includes reaction mass 24 coupled to rotating device 12. Force sensor 14 mounted between device 12 and fixed surface S, and/or axial acceleration sensor 16 coupled to device 12 provide signals to controller 20 indicative of an effect of vibrations on rotating device 12. Controller 20 also receives a signal from angular position sensor 18 so that the rotational velocity of device 12 is known. Controller 20 in response provides a voltage signal to amplifier 22, which in turn provides current to move reaction mass 24 axially in the direction of the arrow to effectively damp the vibrations.

Figure 2:
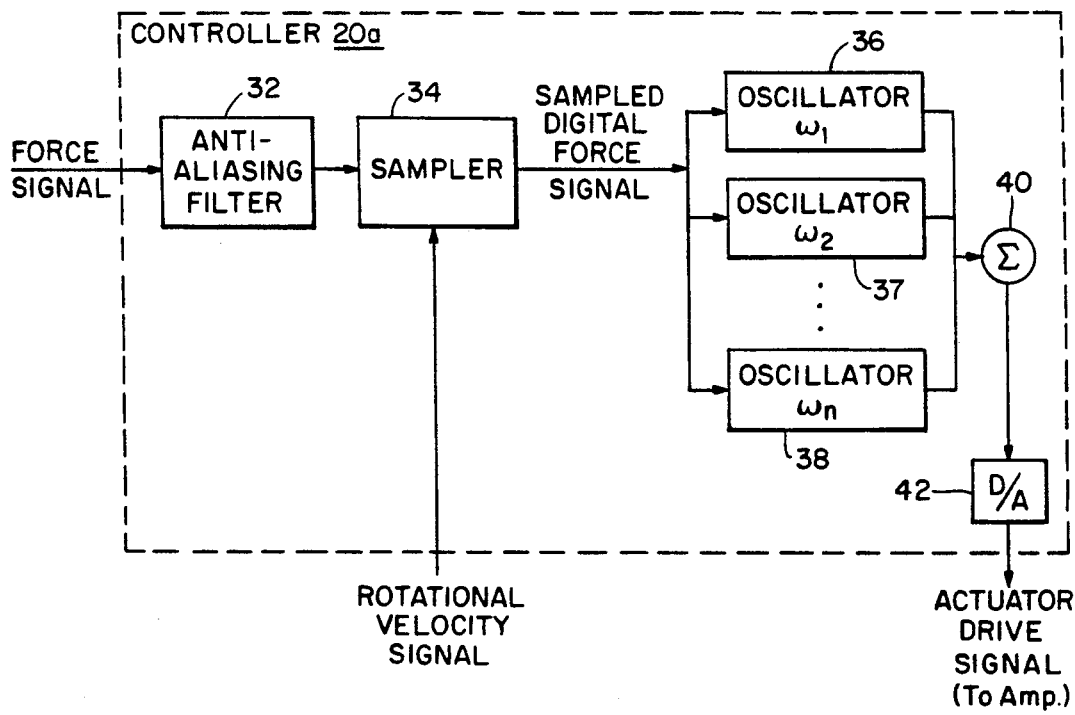
FIG. 2 is a more detailed schematic block diagram of the controller of the system of FIG. 1.

A preferred embodiment of controller 20a is shown schematically in FIG. 2. This embodiment employs a force signal from sensor 14 that is indicative of an effect on rotating device 12 of the vibrations to be damped.

The force signal is applied to anti-aliasing filter 32 that prevents high frequency signals from being aliased into the controlled bandwidth, and the output is supplied to sampler 34 for digitizing the analog signal. The rotational velocity signal from sensor 13, FIG. 1, is also applied to sampler 34 so that the controller output has the proper frequency outputs with respect to the rotational velocity to effectively damp the vibrations. The frequency of the oscillators may also be controlled by having a fixed sample rate from sampler 34, and using the rotational speed signal directly to change the frequency of the oscillators. The control signal is applied to reaction mass 24 so that the mass moves 180° out of phase with the disturbing force, and creates a force whose amplitude is the same as the disturbing force to completely cancel that force.

The properly sampled digital force signal is then applied to a number of oscillators 36 through 38 having frequencies $\omega_1$ through $\omega_n$. The frequency of the oscillators is controlled to be the fundamental and harmonic frequencies of the vibrations. Because the frequencies of the disturbance are known in advance, the system does not require the high loop band widths and have the resulting performance sensitivity to sensor noise and poor stability margins of conventional broad-band or band-following control lops. Oscillators 36 through 38 effectively provide an infinite gain at each particular frequency. The outputs of oscillators 36 through 38 are then summed by summer 40 and converted to an analog signal by D/A 42 before being applied as an actuator drive signal to amplifier 22, FIG. 1, for creation of a current used to drive reaction mass 24 to cancel the effect of the vibrations on the rotating device.

Controller 28 has been implemented with a third-generation floating-point digital signal processor, the Texas Instruments TMS 320C30 contained on a board plugged into a personal computer back plane. Sixteen bit analog to digital and digital to analog boards were used to secure adequate signal to noise ratios. The rotational velocity signal from the shaft speed encoder is used to ensure that the digital signal processor is synchronized with the rotational speed of the shaft and, therefore, that the feedback signals are at precisely the correct frequency to cancel the speed synchronous disturbance forces on the rotating shaft. The compensator gain is made infinite at the disturbance frequencies and small elsewhere.

Figure 3:
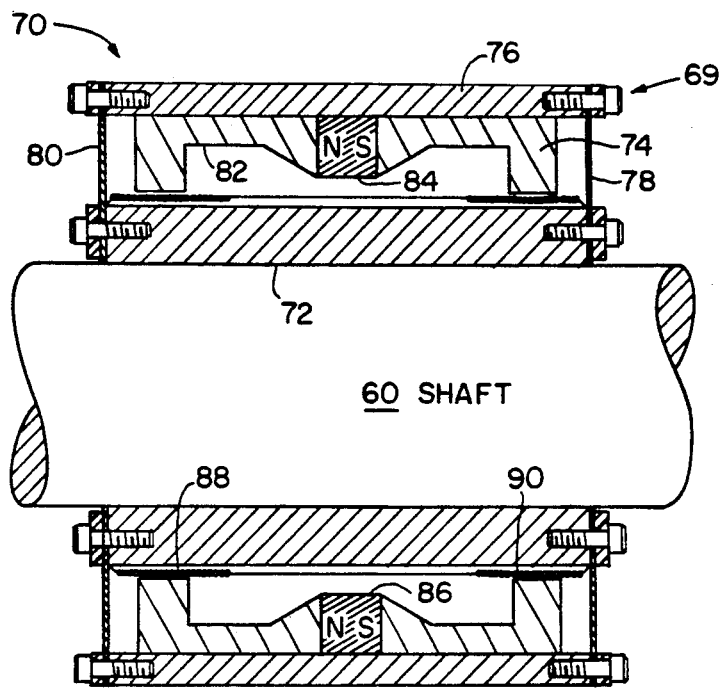
FIG. 3 is a cross sectional view of a preferred form of the reaction mass actuator for the system of FIG. 1.

An embodiment of a reaction mass actuator 70 which has been used to damp vibrations on a rotating shaft is shown in FIG. 3. Actuator 70 includes a magnetically heat treated cold rolled steel support 72 onto which coils 88 and 90 are wound. Support 72 is heat shrunk onto the shaft for a very tight fit to prevent vibration. Each coil is a double layer of 24 gauge wire to create an actuator with a resistance of 4 ohms and a conductance of 6.8 mH. Reaction mass 69 is connected to the shaft by annular flexures 80 and 78 bolted to support 72. Reaction mass 69 includes retaining sleeve 70, back iron 82, and a plurality of permanent magnets such as magnets 84 and 86 to create a Lorentz force type actuator where current in the coils interacts with the permanent magnetic field to produce force. In this design, there are eight 1"×1"×0.5" permanent magnets equally spaced circumferentially around the shaft and embedded within back iron 82. The magnets generate a flux that passes radially inward through one coil and radially outward through the second coil. The two drive coils are connected in anti-series such that the drive current flows circumferentially in opposite directions. The Lorentz-force interaction of these circumferential currents with the permanents magnet flux generates a net axial force pair that acts on the shaft and, in the opposite axial direction, acts on the reaction mass.

Flexures 78 and 80 allow reaction mass 69 to move left and right along the axis of the shaft, while preventing radial mass movement. Further, the flexures provide an elastic restoring force to return reaction mass 69 to its resting location shown in FIG. 3 when no current is applied to the actuator coils. Flexures 78 and 80 may be accomplished with beryllium copper approximately 0.01" thick. The force constant for the reaction mass actuator used in a test bed for a 25 pound rotating shaft was four pounds per amp. In this embodiment force was sensed by a piezoelectric unit manufactured by Kistler Instruments, and acceleration was measured with a Kistler piezoelectric load cell model 8612B.

Figure 4:
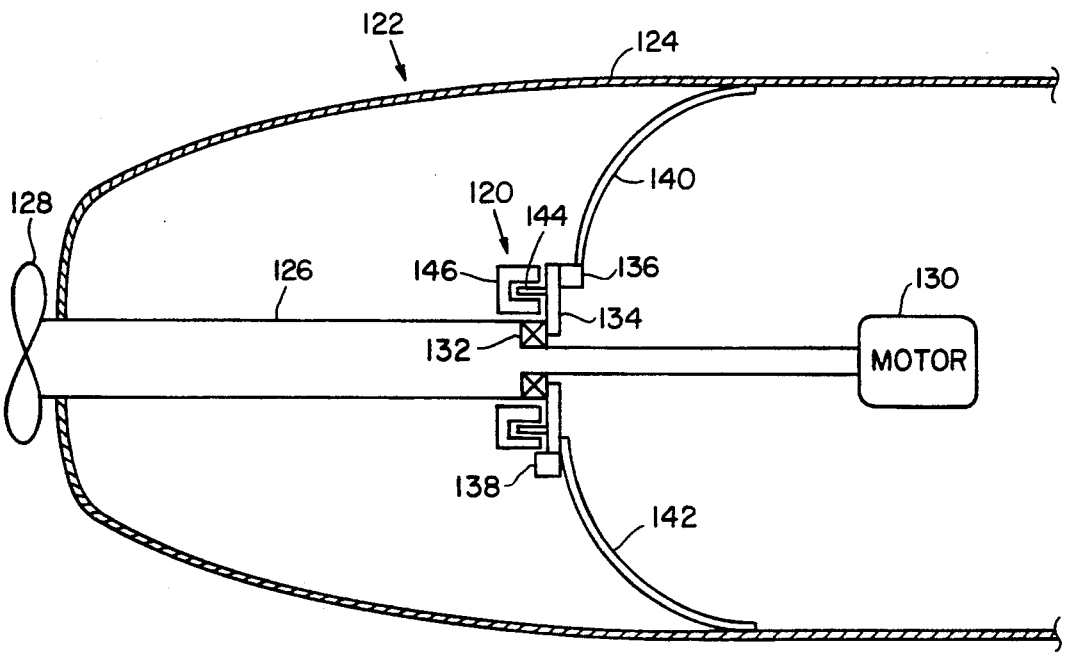
FIG. 4 is a schematic diagram of an alternative to the system of FIG. 1.

FIG. 4 details another form of vibration control for a rotating shaft, in particular propeller shaft 126 of torpedo 122 having outer shell 124 and propeller 128 driven by motor 130. The mounting of shaft 126 within body 124 is typically accomplished with supports 140 and 142 that are coupled to support plate 134 that is itself coupled to thrust bearing 132. This coupling allows vibrations of shaft 126 to travel out to body 124 and radiate into the water as noise. The vibrations may be controlled by either mounting an actuator to shaft 126 as described above or alternatively by mounting actuator 120 to plate 134 to cancel the vibrations before they reach body 124. Also, since plate 134 is mechanically coupled to shaft 126, by cancelling vibrations in plate 134, vibrations in shaft 126 will be reduced. Actuator 120 is schematically depicted in this case by fixed member 144 attached to plate 134 which interacts with magnetic force producing member 146 to counteract vibrations within plate 134. Force sensor 136 mounted between mounting member 140 and plate 134, and/or accelerometer coupled to plate 134, may be used to derive a signal related to the vibrations transmitted through plate 134 for controlling the reaction mass as described above.

Although specific features of the invention are shown in some drawings and not others, this is for convenience only as some feature may be combined with any or all of the other features in accordance with the invention.

Other embodiments will occur to those skilled in the art and are within the following claims:

What is claimed is:

1. A method of damping axial vibrations of a rotating device, comprising:
   coupling a reaction mass in a manner in which it has an effect on vibrations of the rotating device;
   providing means for moving said reaction mass to counter vibrations from the rotating device;
   measuring an effect of vibrations from the rotating device; and
   moving said reaction mass in response to said measured effect to damp the effect and the vibrations.

2. The method of claim 1 in which measuring an effect includes determining the axial acceleration of the rotating device.

3. The method of claim 1 in which measuring an effect includes determining the force between the rotating device and a fixed surface.

4. The method of claim 1 further including determining the rotational velocity of the rotating device, in which moving the reaction mass is also responsive to the determined velocity.

5. The method of claim 1 in which coupling a reaction mass includes fixing the mass to the rotating device.

6. The method of claim 5 in which fixing the reaction mass includes radially constraining the reaction mass.

7. The method of claim 5 in which the reaction mass is moved axially along the rotating device.

8. The method of claim 7 in which providing means for moving said reaction mass includes mounting windings on the rotating device.

9. The method of claim 8 in which providing means for moving said reaction mass further includes coupling at least one permanent magnet to said rotating device radially spaced from said windings.

10. The method of claim 9 in which moving said reaction mass includes selectively applying current to said windings.

11. The method of claim 1 in which coupling a reaction mass includes providing a flexible coupling allowing axial mass movement and providing an axial restoring force to return the mass to its original position.

12. The method of claim I in which the reaction mass is coupled to a fixed member in mechanical contact with the rotating device.

13. A method of damping axial vibrations of a rotating shaft, comprising:
coupling a reaction mass to the shaft, said reaction mass including a permanent magnet and back iron constrained radially and movable axially in relation to the shaft;
coupling windings to the shaft for selectively providing a magnetic field for interacting with the field from said permanent magnet to move the reaction mass axially along the shaft;
determining the shaft rotational velocity;
measuring an effect of vibrations on the shaft; and
selectively providing current to the windings in response to the shaft rotational velocity and the measured effect to move the reaction mass to damp the effect and the vibrations.

14. A lorentz force vibration damping system for cancelling rotating shaft axial vibrations, comprising:
a reaction mass elastically coupled to the shaft;
means for measuring the shaft rotational velocity and an effect of vibrations on the shaft; and
a lorentz force reaction mass actuator, responsive to said means for measuring, for selectively moving said reaction mass axially along the shaft to suppress shaft axial vibrations.

15. The system of claim 14 in which said reaction mass is elastically coupled to the shaft with flexures that radially constrain and tend to axially restore said mass.

16. The system of claim 14 in which said reaction mass includes a permanent magnet and back iron for providing a flux path.

17. The system of claim 16 in which said reaction mass actuator includes selectively energized windings for interacting with the permanent magnetic flux to create a reaction mass axial movement force.

18. The system of claim 16 in which said reaction mass includes a plurality of circumferentially spaced permanent magnets.

19. A rotational shaft axial vibration damping system, comprising:
a reaction mass coupled to the shaft;
means for measuring an effect of shaft axial vibrations; and
means, responsive to said means for measuring, for axially moving said reaction mass to damp the measured effect and the vibrations.

20. The system of claim 19 in which said means for axially moving said reaction mass includes means for selectively applying magnetic force to said reaction mass.

21. The system of claim 20 in which said reaction mass includes a plurality of circumferentially-spaced permanent magnets and said means for selectively applying magnetic force includes selectively energizable coils for interacting with the permanent magnetic flux.

* * * * *

UNITED STATES PATENT AND TRADEMARK OFFICE
CERTIFICATE OF CORRECTION

PATENT NO. : 5,291,975
DATED : March 8, 1994
INVENTOR(S) : Bruce G. Johnson, et al It is certified that error appears in the above-indentified patent and that said Letters Patent is hereby corrected as shown below:

Column 1, before "FIELD OF INVENTION", insert the following paragraph:

-- GOVERNMENT RIGHTS

This invention was made with U.S. Government support under Contract No. N66604-91-C-5171, awarded by the Department of the Navy. The Government has certain rights in the invention. --

Signed and Sealed this

Thirtieth Day of August, 1994

BRUCE LEHMAN

*Attest:*

*Attesting Officer*     *Commissioner of Patents and Trademarks*